Jan. 8, 1935.  G. FAUSER  1,987,552
PROCESS FOR THE PREPARATION OF AMMONIUM NITRATE
Filed May 21, 1931
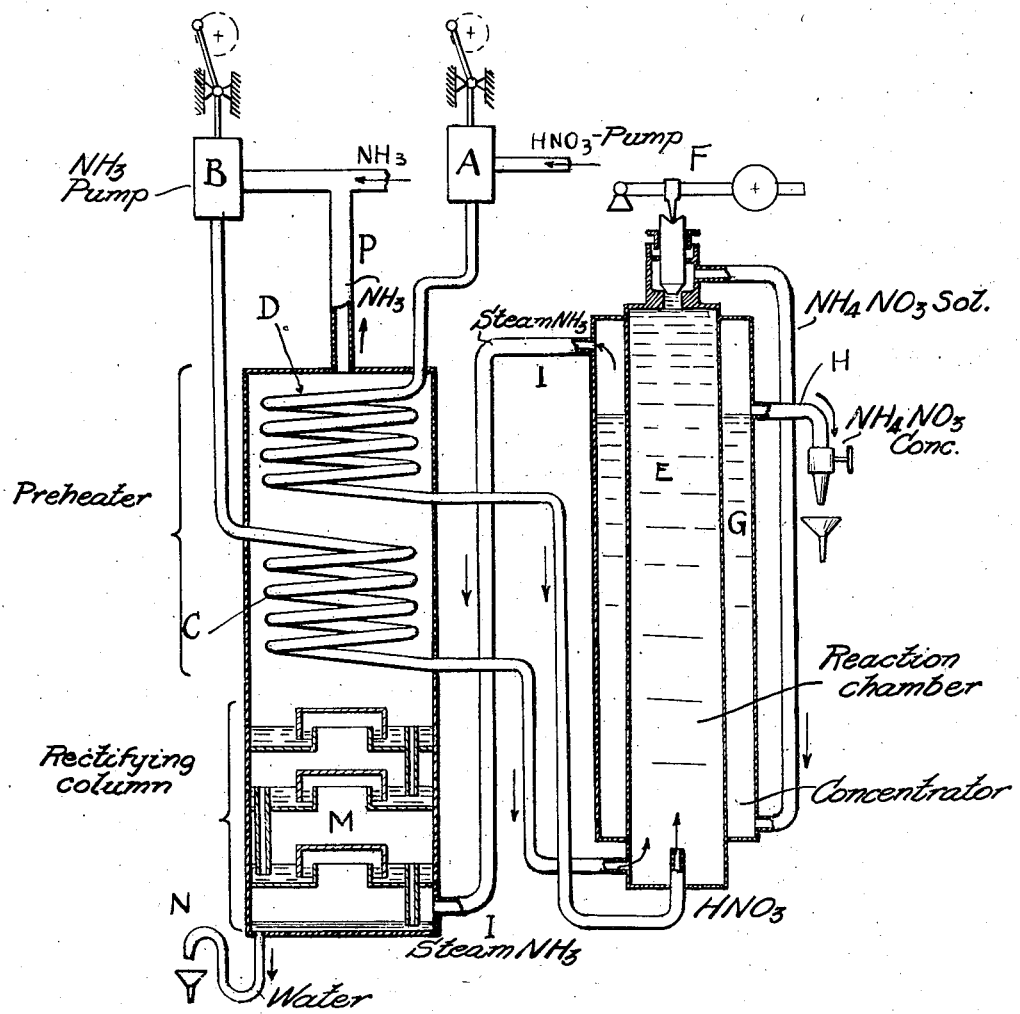
Inventor:
Giacomo Fauser
By Knight Bros.
his attys.

Patented Jan. 8, 1935

1,987,552

UNITED STATES PATENT OFFICE 1,987,552

PROCESS FOR THE PREPARATION OF AMMONIUM NITRATE

Giacomo Fauser, Novara, Italy, assignor to Montecatini, Società Generale per l'Industria Mineraria Ed Agricola, Milan, Italy, a joint-stock company of Italy Application May 21, 1931, Serial No. 539,102
In Italy June 2, 1930

REISSUED

6 Claims. (Cl. 23—103)

The commercial preparation of ammonium nitrate has been heretofore carried out by saturating nitric acid with ammonia in intensely cooled apparatus in order to avoid a temperature increase in the acid during the reaction.

The reason for such a cooling lies in the fact that the boiling temperature of nitric acid is lower than that of an ammonium nitrate solution, so that it would not be practicable to increase the heat of reaction in order to evaporate the mother liquor of the solution, as is practised, on the contrary, in the preparation of ammonium sulphate.

A further reason why an intense cooling of the ammonium nitrate saturators during the reaction is resorted to may be explained by the fact that such apparatus is quickly corroded by boiling nitric acid solutions.

However, the elimination of the heat generated by the reaction between nitric acid and ammonia by means of cooling water represents an irrational operation, since the ammonium nitrate solution obtained in that way is very much diluted, and in order to get the dry salt therefrom it is necessary to subsequently submit the said solution to a concentration requiring a considerable expense of heat or steam.

The present invention provides a simple means of obviating the above difficulties, inasmuch as it permits the utilization of the heat of reaction in order to concentrate the ammonium nitrate solution without incurring the loss of nitric acid and ammonia.

The invention essentially consists in carrying out the reaction between nitric acid and ammonia in a receptacle or container at a higher pressure than that corresponding to the vapor tension of the ammonium nitrate solution obtained, at the temperature resulting from the reaction. This solution is subsequently passed into another receptacle at atmospheric pressure or, better, at a reduced pressure, and is evaporated through the heat developed by the reaction itself.

A diagram of the process is shown in the accompanying drawing, it being understood however that the invention is not limited to the details shown.

The nitric acid and ammonia are drawn by the pumps A and B respectively and conveyed, in the proportions requisite for the reaction, into the coils C and D where they are preheated by means of the steam derived from the concentration of the mother liquor. From the preheaters, the nitric acid and ammonia pass into the saturator E, where, due to the heat developed by the reaction, the temperature rises up to 170–180° C. However no nitric vapours can develop since a higher pressure is maintained than that corresponding to the vapor tension of the resulting solution at the temperature produced by the reaction.

In order to avoid corrosion of the metal surface of the receptacle, it is advisable to provide a slight excess of ammonia over the stoichiometric proportions required by the reaction, so as to render the ammonium nitrate solution alkaline.

The pressure inside of the reaction chamber E is maintained constant by means of an automatic valve F, which permits the ammonium nitrate solution continuously to discharge itself into the outer vessel G, this vessel being at atmospheric pressure or, better, below atmospheric pressure. The liquid in contact with the inner vessel is heated to ebullition, and the concentrated ammonium nitrate solution is led off by the pipe H, whilst the steam developing from the solution is conveyed by the pipe I to the rectifying column M. The duty of this column is to separate the small amount of ammonia present in the wet steam, and at the same time to preheat the nitric acid and ammonia passing to the saturator for reaction. The extracted water is discharged through the siphon N, whereas the ammonia is recovered through the pipe P, and returned to the cycle.

Having now particularly described and ascertained the nature of my said invention and in what manner the same is to be performed, I declare that what I claim is:—

1. The process of preparing a concentrated solution of ammonium nitrate which comprises reacting ammonia with a solution of nitric acid in a container at a pressure greater than the vapor tension of the resulting solution of ammonium nitrate at the temperature produced by the reaction, passing said solution of ammonium nitrate into a second container surrounding said first container at a pressure inferior to that of the first container, and evaporating the water in said last-mentioned solution by the heat generated in said first container.

2. The process of preparing a concentrated solution of ammonium nitrate which comprises reacting ammonia with a solution of nitric acid at a pressure greater than the vapor tension of the resulting solution of ammonium nitrate at the temperature produced by the reaction, passing off said solution of ammonium nitrate, and concentrating said last-mentioned solution by the evaporation thereof, at a pressure lower than that at which said reaction is effected, by the heat of the reaction of the ammonia with the nitric acid solution.

3. The process of preparing a concentrated solution of ammonium nitrate which comprises pumping ammonia and a solution of nitric acid through separate coils disposed in a container, mixing and reacting said ammonia with said solution of nitric acid at a pressure greater than the vapor tension of the resulting solution of ammonium nitrate at the temperature produced by the reaction, passing off said solution of ammonium nitrate, evaporating said last-mentioned solution, at a pressure lower than that at which said reaction is effected, by the heat of the reaction of the ammonia with the nitric acid solution, and leading said last-mentioned vapor products to said container to effect a preliminary heating of the ammonia and nitric acid solution passing through the coils disposed in said container.

4. The process of preparing a concentrated solution of ammonium nitrate which comprises pumping ammonia and a solution of nitric acid through separate coils disposed in a rectifying column, mixing and reacting said ammonia with said solution of nitric acid in a container at a pressure greater than the vapor tension of the resulting solution of ammonium nitrate at the temperature produced by the reaction, said mixture consisting of a slight excess of ammonia over the stoichiometric proportions required, in order to render the solution of ammonium nitrate alkaline and thus avoid the corrosion of the metal surfaces of the container, passing off said solution of ammonium nitrate, evaporating said last-mentioned solution, at a pressure inferior to that at which said reaction is effected, by the heat of the reaction of the ammonia with the nitric acid solution, leading said last-mentioned vapor products to said rectifying column to effect a preliminary heating of the ammonia and nitric acid solution passing through the coils disposed in said rectifying column and to separate the excess ammonia from the water vapor for repeated utilization.

5. The process of preparing a concentrated solution of ammonium nitrate which comprises mixing and reacting ammonia with a solution of nitric acid in a container at a pressure greater than the vapor tension of the resulting solution of ammonium nitrate at the temperature produced by the reaction, passing said solution of ammonium nitrate into a second container surrounding said first container at a pressure inferior to that of the first container and inferior to atmospheric pressure, and evaporating the water in said last-mentioned solution by the heat generated in said first container.

6. The process of preparing a concentrated solution of ammonium nitrate, which comprises continuously pumping ammonia and a solution of nitric acid through separate tubings into a container, where they are mixed and reacted; maintaining a pressure in said container greater than the vapor tension of the resulting solution of ammonium nitrate at the temperature produced by the reaction, while continuously passing off said solution of ammonium nitrate from said container; evaporating the last-mentioned solution, at a pressure inferior to that at which said mixing is effected, by the heat generated in said container; and continuously discharging the solution of concentrated ammonium nitrate thus prepared.

GIACOMO FAUSER.